United States Patent
Matsuo

(10) Patent No.: US 7,370,887 B2
(45) Date of Patent: May 13, 2008

(54) RIDER RESTRAINT APPARATUS

(75) Inventor: Hisashi Matsuo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 261 days.

(21) Appl. No.: 11/232,041

(22) Filed: Sep. 22, 2005

(65) Prior Publication Data

US 2006/0066091 A1    Mar. 30, 2006

(30) Foreign Application Priority Data

Sep. 29, 2004    (JP)    ............... 2004-284909

(51) Int. Cl.
*B60R 22/06*    (2006.01)

(52) U.S. Cl. .............. 280/804; 280/807; 280/290; 297/485

(58) Field of Classification Search ............ 280/801.1, 280/801.2, 802–807, 290, 304.4, 748; 297/485, 297/480, 468; 180/268
See application file for complete search history.

(56) References Cited

U.S. PATENT DOCUMENTS

| | | | | |
|---|---|---|---|---|
| 3,404,917 | A * | 10/1968 | Smith ...................... | 297/256.1 |
| 3,827,716 | A * | 8/1974 | Vaughn et al. ........... | 280/730.1 |
| 4,469,351 | A * | 9/1984 | Matsuoka .................. | 280/806 |
| 4,790,597 | A * | 12/1988 | Bauer et al. ................ | 297/468 |
| 4,995,640 | A * | 2/1991 | Saito ......................... | 280/804 |
| 5,076,609 | A * | 12/1991 | Park .......................... | 280/804 |
| 5,275,437 | A | 1/1994 | Mödinger et al. | |
| 5,437,475 | A * | 8/1995 | Sugimoto ................. | 280/801.2 |
| 6,286,869 | B1 * | 9/2001 | Osendorfer et al. ..... | 280/801.1 |
| 6,793,033 | B2 * | 9/2004 | Yamazaki et al. .......... | 180/268 |
| 2001/0002087 | A1 * | 5/2001 | Townsend ................ | 280/801.1 |
| 2004/0108706 | A1 * | 6/2004 | Enomoto ................... | 280/807 |
| 2004/0119277 | A1 * | 6/2004 | Girardin .................. | 280/801.2 |
| 2004/0150212 | A1 * | 8/2004 | Russell et al. .............. | 280/808 |
| 2004/0178668 | A1 * | 9/2004 | Kassai et al. ............ | 297/250.1 |
| 2005/0242563 | A1 * | 11/2005 | Daume et al. ........... | 280/801.2 |
| 2005/0275210 | A1 * | 12/2005 | Bell et al. .................... | 280/806 |
| 2006/0038391 | A1 * | 2/2006 | Bell et al. ................... | 280/807 |
| 2006/0066091 | A1 * | 3/2006 | Matsuo .................... | 280/801.1 |
| 2007/0040371 | A1 * | 2/2007 | Armstrong ............... | 280/801.1 |

FOREIGN PATENT DOCUMENTS

| | | |
|---|---|---|
| DE | 2531490 A1 | 2/1977 |
| DE | 3341568 A1 | 5/1985 |
| EP | 0820909 A2 | 1/1998 |
| JP | 2003-276668 A | 10/2003 |

\* cited by examiner

*Primary Examiner*—Paul N. Dickson
*Assistant Examiner*—Karen J. Amores
(74) *Attorney, Agent, or Firm*—Birch, Stewart, Kolasch & Birch, LLP

(57) ABSTRACT

To provide rider restraint means capable of allowing a rider to freely leave a vehicle without a manual release operation when there is no need to restrain the rider to the vehicle. The rider restraint means includes a belt restraining a rider, buckles making the belt detachable, a guide rail making the buckles slidable, a retractor unit controlling the slide of the buckles, and coupling release means releasing coupling between the belt and the buckles in conjunction with the slide of the buckles. The coupling release means includes an inner wire, a wire stopper, and a wire end. The coupling release means releases the coupling between the belt and the buckles when the retractor unit loosens the winding after collision and the buckles slide by a predetermined distance or more or when the rider continues to pull the belt in a state other than collision and the buckles slide by a predetermined distance or more.

20 Claims, 8 Drawing Sheets

RIDER RESTRAINT APPARATUS

CROSS-REFERENCE TO RELATED APPLICATIONS

This nonprovisional application claims priority under 35 U.S.C. § 119(a) on Patent Application No. 2004-284909, filed in Japan on Sep. 29, 2004, the entirety of which is incorporated herein by reference.

BACKGROUND OF THE INVENTION

1. Field of the Invention

The present invention relates to a rider restraint apparatus. In particular, the present invention relates to a rider restraint apparatus, which is suitable for a small vehicle and is capable of allowing a rider to leave the vehicle freely when there is no need to restrain the rider on the vehicle.

2. Description of Background Art

A rider restraint apparatus of a small vehicle has been hitherto known in the background art. The rider restraint apparatus according to the background art includes an airbag that absorbs impact which the rider is subjected to when the vehicle crashes and a seat belt that prevents the rider from leaving forward to enhance the effect of the airbag to absorb impact. In four-wheel passenger vehicles and the like, to obtain sufficient impact absorption by an expanded and inflated airbag, it is necessary to use a seat belt configured to be strained upon detection of impact together with the airbag. In small vehicles such as two-wheeled vehicles, the use of a seat belt unit is considered to further enhance the effect of the airbag. Moreover, in small vehicles such as two-wheeled vehicles, it is desirable that the restraint by the seat belt be released when a secondary motion occurs after a collision.

To solve the aforementioned problems, Japanese Patent Laid-open Publication No. 2003-276668 discloses a technology that restrains the rider with a seat belt to further enhance the impact absorption effect of the airbag and releases the restraint at a predetermined period of time after the airbag, working with a collision detection sensor, starts inflating and expanding or when a fall sensor detects secondary motion after a collision.

SUMMARY OF THE INVENTION

However, the structure as described in Japanese Patent Laid-open Publication No. 2003-276668 has an actuator that is driven to release the restraint based on a signal detected by an electrical sensor such as an impact sensor detecting impact or a fall sensor detecting a fall. Therefore, this structure is problematic in that many components and many assembly hours are needed due to the control of the electrical elements. In addition, when a rider wants to leave the vehicle quickly when the vehicle is being operated at a comparatively low speed where secondary motion is less likely to occur, there is a problem in that a manual operation to release the restraint is required.

The present invention was made in the light of the aforementioned problems, and an object of the present invention is to provide a rider restraint apparatus which can allow a rider to leave a vehicle quickly without a manual release operation when there is no need to restrain the rider to the vehicle and which is excellent in productivity with fewer electronic components and fewer assembly hours needed.

To achieve the aforementioned object, a first aspect of the present invention is a rider restraint apparatus restraining movement of a rider, including: a seat belt-shaped rider restraint restraining the rider; a detachable device making the rider restraint detachable; a rail making the detachable device slidable; a control controlling sliding of the rider restraint; and a coupling release device that releases a coupling between the rider restraint and the detachable device in conjunction with the slide of the detachable device. The coupling release device releases the coupling between the restraint and the detachable device when the detachable device slides along the rail by a predetermined distance or more.

A second aspect of the present invention is that the rider restraint includes, at each of its ends, a coupling portion which is engaged with the detachable device. Moreover, a device allowing the coupling portion to be detached and the coupling release device are provided for the rail in a pair.

A third aspect of the present invention is that the rail is formed into a substantially U-shape.

A fourth aspect of the present invention is that the coupling release device includes a wire attached to the detachable device, a wire end formed at an end of the wire, and a wire stopper restricting motion of the wire end.

Furthermore, a fifth aspect of the present invention is that an end of an outer tube is attached to the detachable device, and the outer tube covers a part of the wire.

According to the first aspect of the present invention, the coupling is released when a secondary motion occurs during rapid deceleration at collision or the like, and it is possible to reduce an influence of the secondary motion on the rider. Moreover, in the case of comparatively low speed where the secondary motion is less likely to occur, the rider can leave the vehicle quickly without a manual operation to release the coupling.

According to the second aspect of the present invention, a plurality of the detachable devices and a plurality of the coupling release devices are provided. Accordingly, it is possible to restrain the rider more quickly than the case with a piece of the detachable device and a piece of the coupling release device when it is required to restrain the rider. Furthermore, it is possible to release the restraint more quickly than the case with a piece of the detachable device and a piece of the coupling release device when the restraint of the rider becomes unnecessary.

According to the third aspect of the present invention, the rail is formed into a substantially U-shape, and the entire apparatus including a retractor unit can be formed into a compact shape.

According to the fourth aspect of the present invention, the apparatus is not electrically controlled so that it can release the coupling without the need for electricity. Moreover, the number of components and the length of assembly hours can be reduced, thus increasing the productivity.

According to the fifth aspect of the present invention, the wire is covered with the outer tube, and the possibility of laying out the wire is increased.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
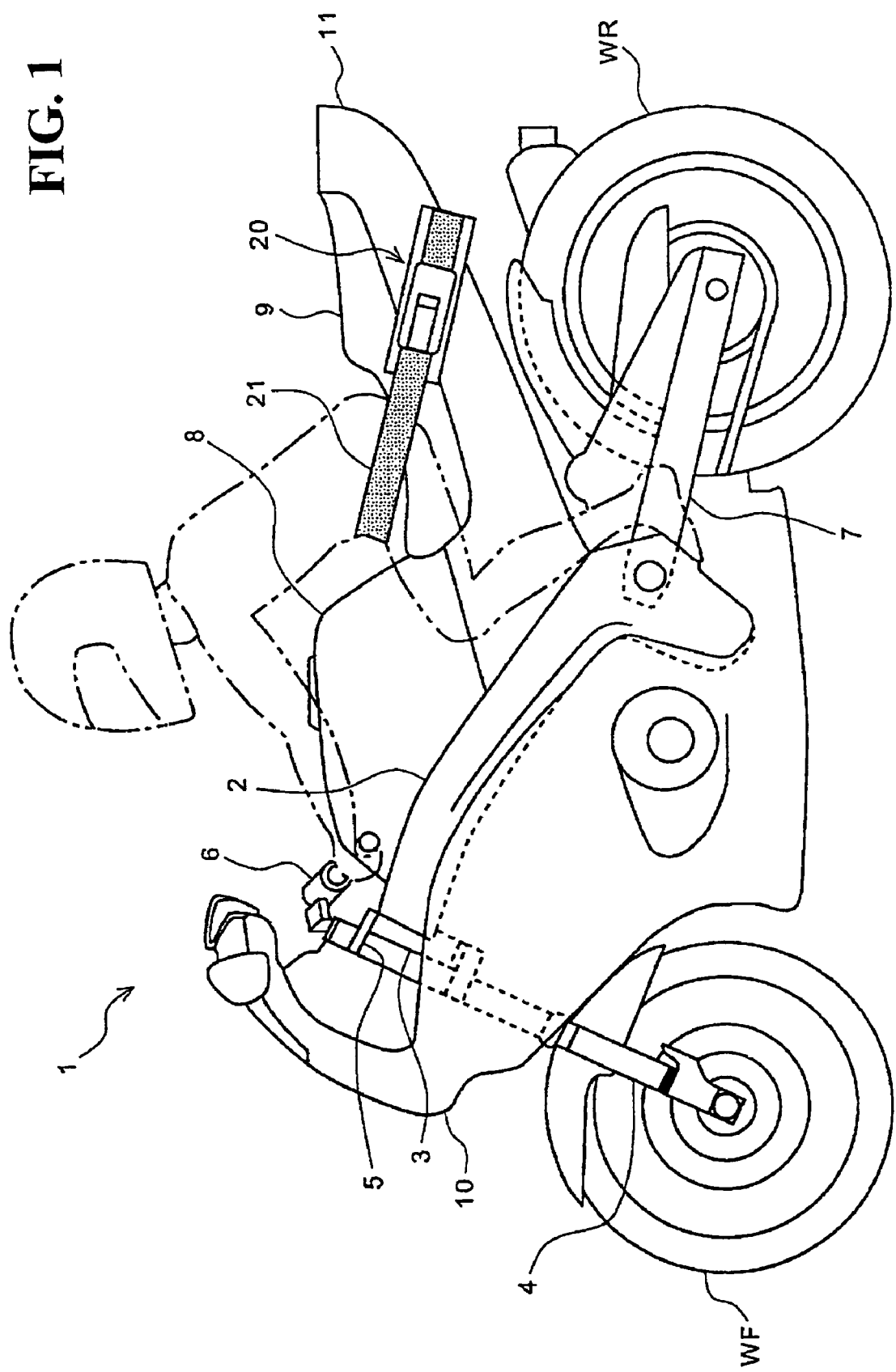
FIG. 1 is a side view schematically showing a structure of a two-wheeled vehicle to which the present invention is applied.

Hereinafter, a description is given of a preferred embodiment of the present invention in detail with reference to drawings. FIG. 1 is a side view of an embodiment of a two-wheeled vehicle to which the present invention is applied.

A head pipe 3 is attached to a front end of a body frame 2 of a two-wheeled vehicle 1. A front fork 4, which pivotally supports a front wheel WF, is steerably attached to the head pipe 3. A steering handle 6 is attached to a top ridge 5 provided in an upper portion of the front fork 4. At a lower rear portion of the vehicle frame 2, a swing arm 7 is pivotally supported so as to swing up and down. At a rear end of the swing arm 7, a rear wheel WR is pivotally supported. In an upper front half of the body flame 2, a fuel tank 8 is disposed. At the rear of the fuel tank 8, a seat 9 on which a rider sits is provided. Most of the two-wheeled vehicle 1 is covered with a body cover composed of a front cowl 10 and a rear cowl 11. A collision detection sensor (not shown) detecting collision of the two-wheeled vehicle 1 with an acceleration sensor or the like is provided at a given place in the center of the vehicle body.

Reference numeral 20 indicates a rider apparatus according to the present invention. The rider restraint apparatus is attached to the two-wheeled vehicle 1 at such a position that a belt 21 as a rider restraint is fastened around the waist of the rider to restrain the rider. The belt 21 fastened around the waist of the rider is pulled while the vehicle is normally running or is stopped so as to restrain the rider with such tension that the belt 21 is not slack.

Figure 2:
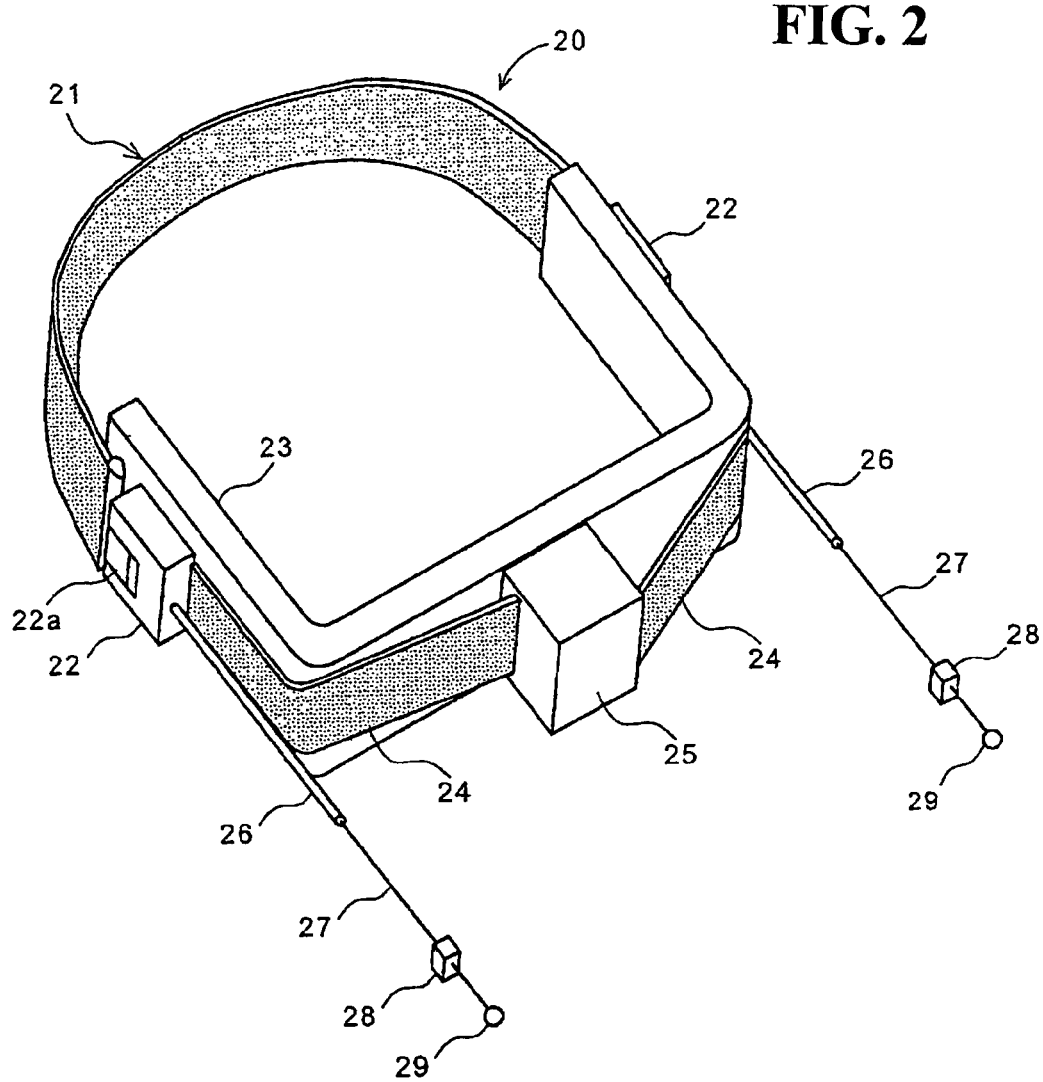
FIG. 2 is a schematic view showing an entire rider restraint apparatus according to the present invention.

FIG. 2 is a schematic view showing the entire rider restraint apparatus 20 according to the present invention. A buckle 22 as a detachable device is slidably placed on each side of the outer surface of a substantially U-shaped guide rail 23 as a rail. Both ends of the belt 21 are respectively connected to the front end faces of the buckles 22. The belt 21 can be detached from the buckles 22 by operating release buttons 22a provided for the buckles 22. An end of a winding belt 24 attached to the rear end face of each buckle 22 extends into a retractor unit 25 which winds up the winding belts 24. The retractor unit 25 serves as a control controlling sliding of the buckles 22. Outer tubes 26 connected to the rear end faces of the buckles 22 similar to the winding belts 24 respectively accommodate inner wires 27. One end of each inner wire 27 is connected to one of the release buttons 22a, and the other end is connected to one of wire ends 29 through one of wire stoppers 28 each including a passage which the inner wire 27 can pass. In this embodiment, the outer tube 26, the inner wire 27, the wire stopper 28, and the wire end 29 constitute a coupling release device. The wire ends 29 are configured such that movement thereof is blocked by the wire stoppers 28.

Figure 3:
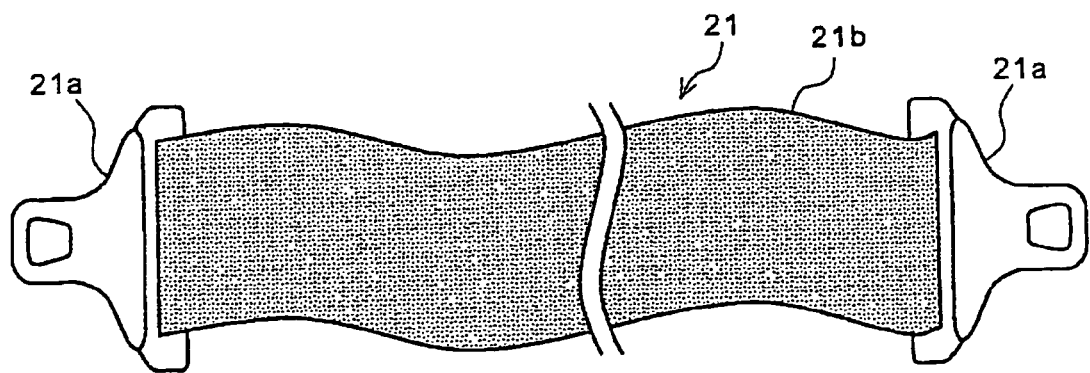
FIG. 3 is a schematic view of an entire belt.

FIG. 3 is a schematic view showing a structure of the belt 21. Tongues 21a which are connected to the buckles 22 are provided at both ends of a belt material 21b, which is formed of fibers such as polyester to be flexible and strong. The belt 21 may have an adjustment function to change the length according to a rider's body.

Figure 4:
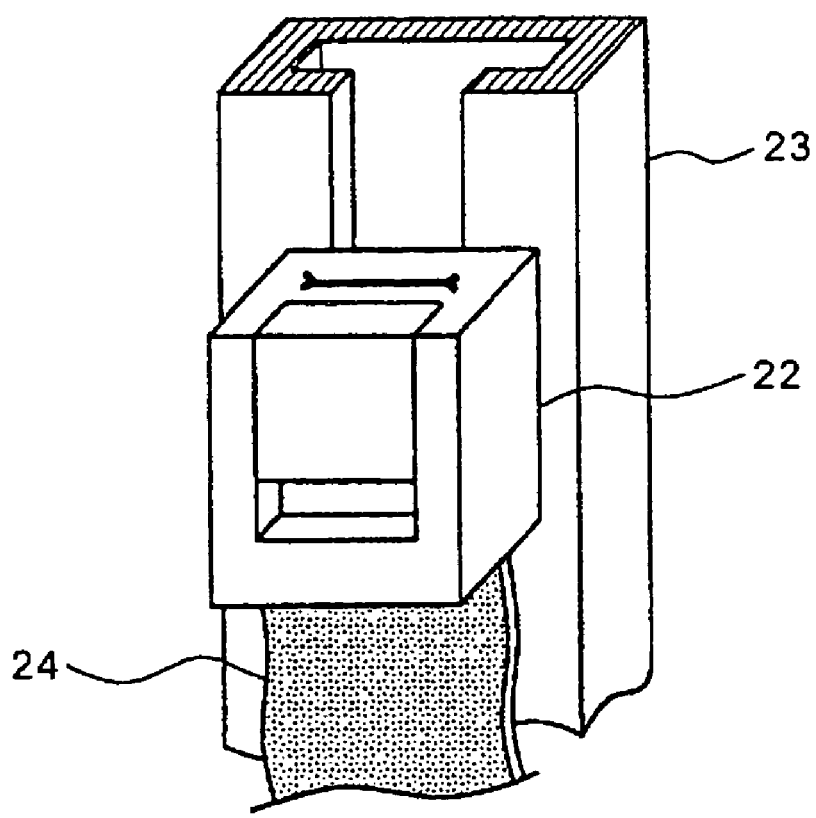
FIG. 4 is a perspective view showing a connection relation between a buckle and a guide rail.
Figure 5:
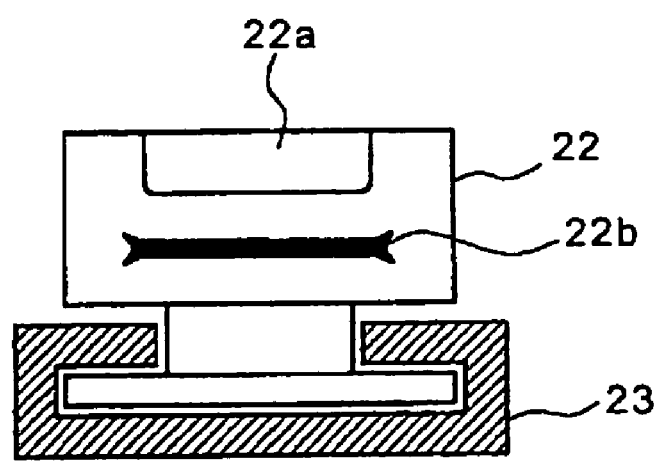
FIG. 5 is a top view showing the connection relation between the buckle and the guide rail.

FIG. 4 shows an engagement relation between the guide rail 23 and the buckle 22. The buckle 22 includes a substantially H-shaped guide as shown in FIG. 5 in a face connected to the guide rail 23 and is configured to be slidable vertically in the drawing along a groove provided for the guide rail 23. Reference numeral 22b of FIG. 5 indicates a slit-shaped hole into which the tongue 21a is inserted.

Figure 6:
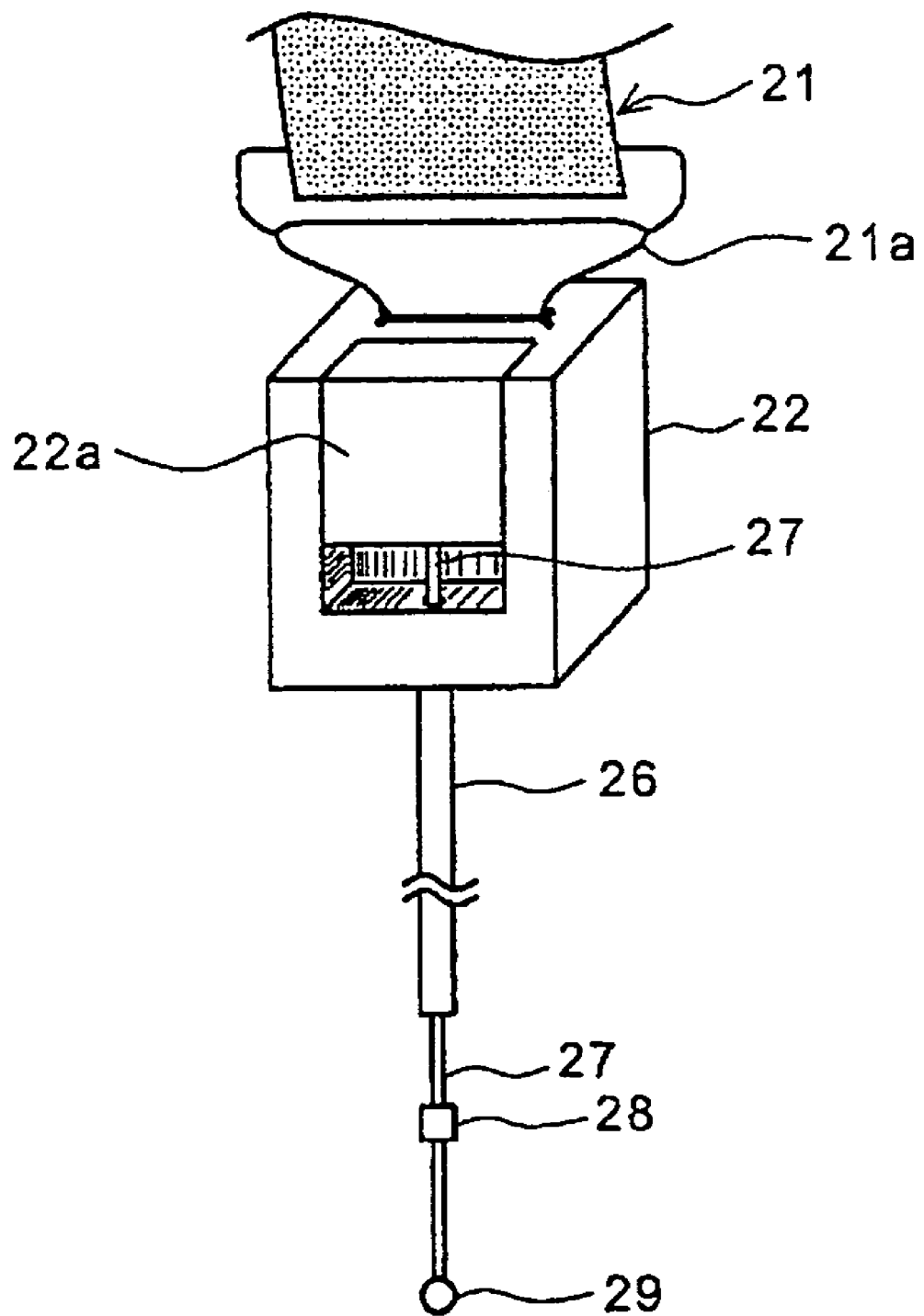
FIG. 6 is an explanatory view showing an operation of a release button of the buckle coupled.
Figure 7:
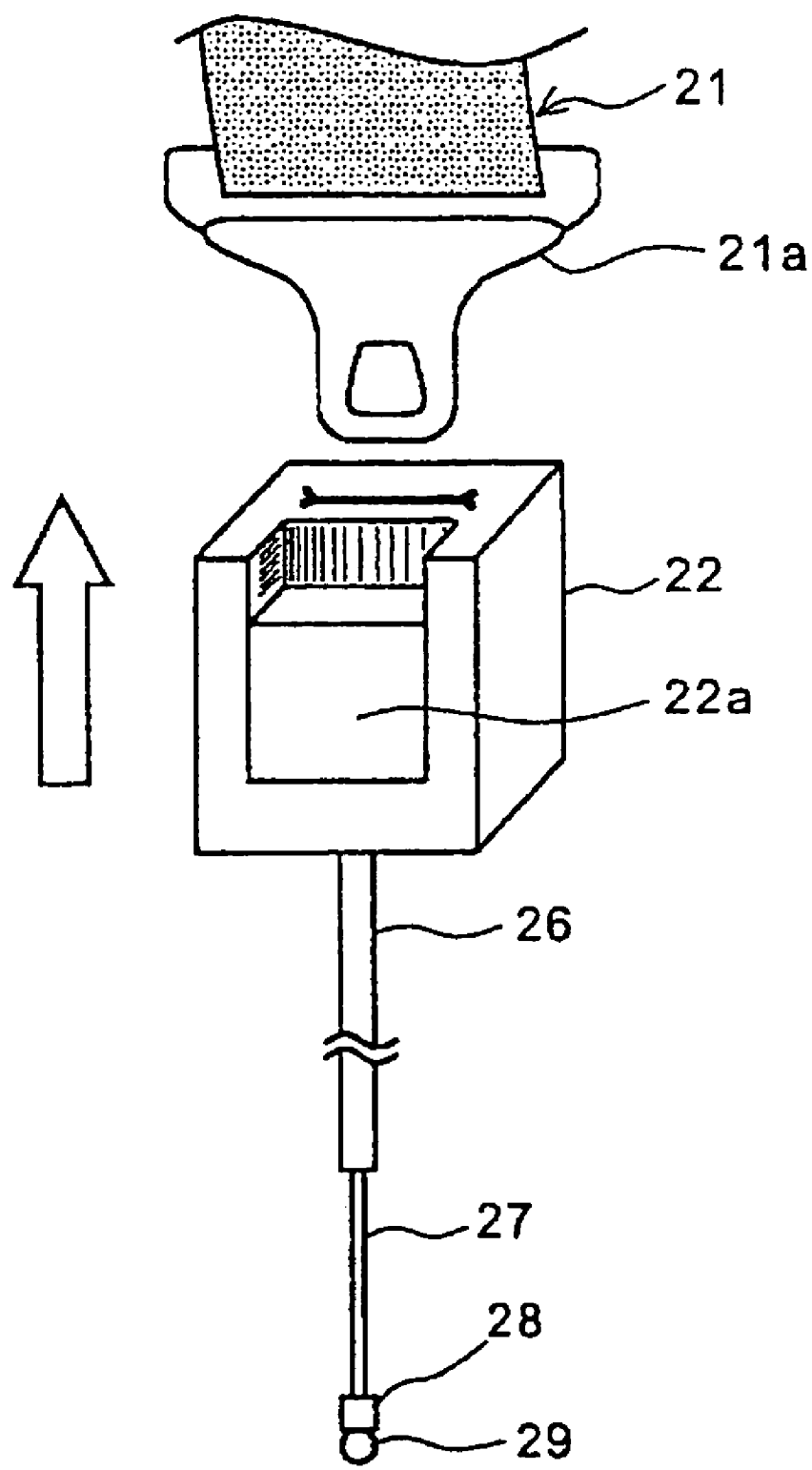
FIG. 7 is an explanatory view of an operation of the release button of the buckle released.

FIGS. 6 and 7 show a relation between the belt 21, the buckle 22, and the inner wire 27. FIG. 6 shows a state where the belt 21 is connected to the buckle 22. At this time, the wire stopper 28 is positioned between the outer tube 26 and the wire end 29. The wire stopper 28 is fixed to a given place where the wire stopper 28 is not influenced by slide of the buckle 22, such as a part of the rider restraint apparatus 20 or a part of the two-wheeled vehicle 1. The given place is, for example, to the rear cowl 11 (see FIG. 1), the retractor unit 25 (see FIG. 2), or the like.

Next, FIG. 7 shows a state where the buckle 22 has slid upward on the guide rail 23 by a predetermined distance. At this time, the position of the wire stopper 28 is the same as the position shown in FIG. 6 because of the aforementioned reason, and the wire end 29 hits the wire stopper 28 when the buckle 22 has slid upward by a predetermined distance. Thereafter, when the buckle 22 further slides upward from the above point of time, tension is generated in the inner wire 27 to pull and operate the release button 22a downward in the drawing, and the buckle 22 then releases the tongue 21a. In other words, when the belt 21 continues to be pulled upward in the drawing from the state of FIG. 6, the belt 21 is released from the buckle 22 at a certain point of time.

Figure 8:
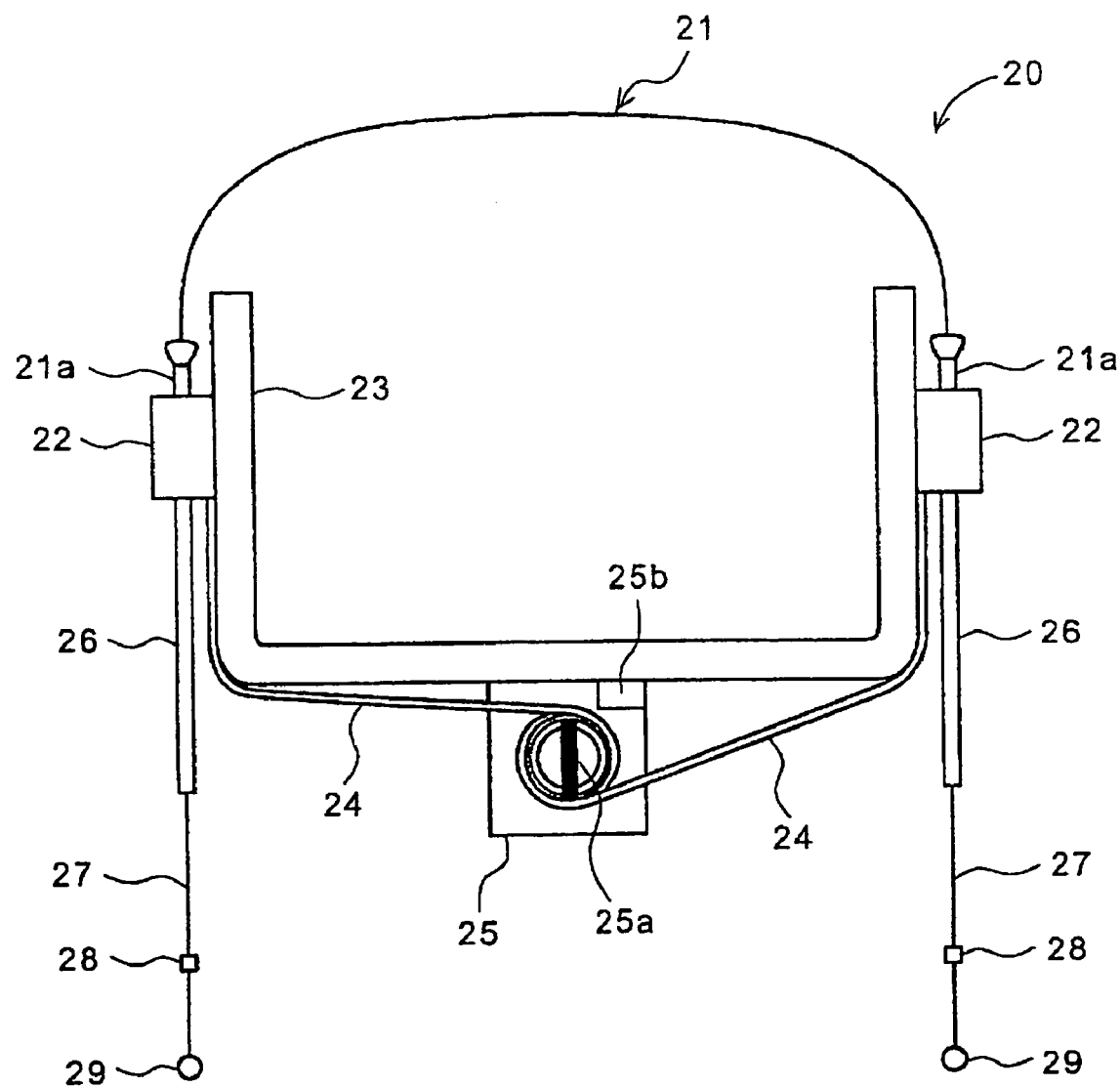
FIG. 8 is a view showing a state of the rider restraint apparatus according to the present invention while the vehicle is normally running or is stopped.

A description will now be given of a function and an operation of this embodiment of the present invention with reference to FIGS. 8 to 10. FIG. 8 shows a state of the rider restraint apparatus while the two-wheeled vehicle 1 is normally running or is stopped. The retractor unit 25 incorporates a retractor 25a and an inflator (gas generator) 25b. The retractor 25a winds the right and left winding belts 24, and the inflator 25b drives the retractor 25a immediately upon collision of the two-wheeled vehicle 1. The thus-structured retractor unit 25 in this embodiment only gives the belt 21 tension enough for the rider to move freely while the vehicle is normally traveling or is stopped. On the other hand, the retractor unit 25 has a pretension function to instantly wind the winding belts 24 and remove a slack due to the thickness of clothes or the like upon collision of the two-wheeled vehicle 1, thus quickly restraining the rider.

Figure 9:
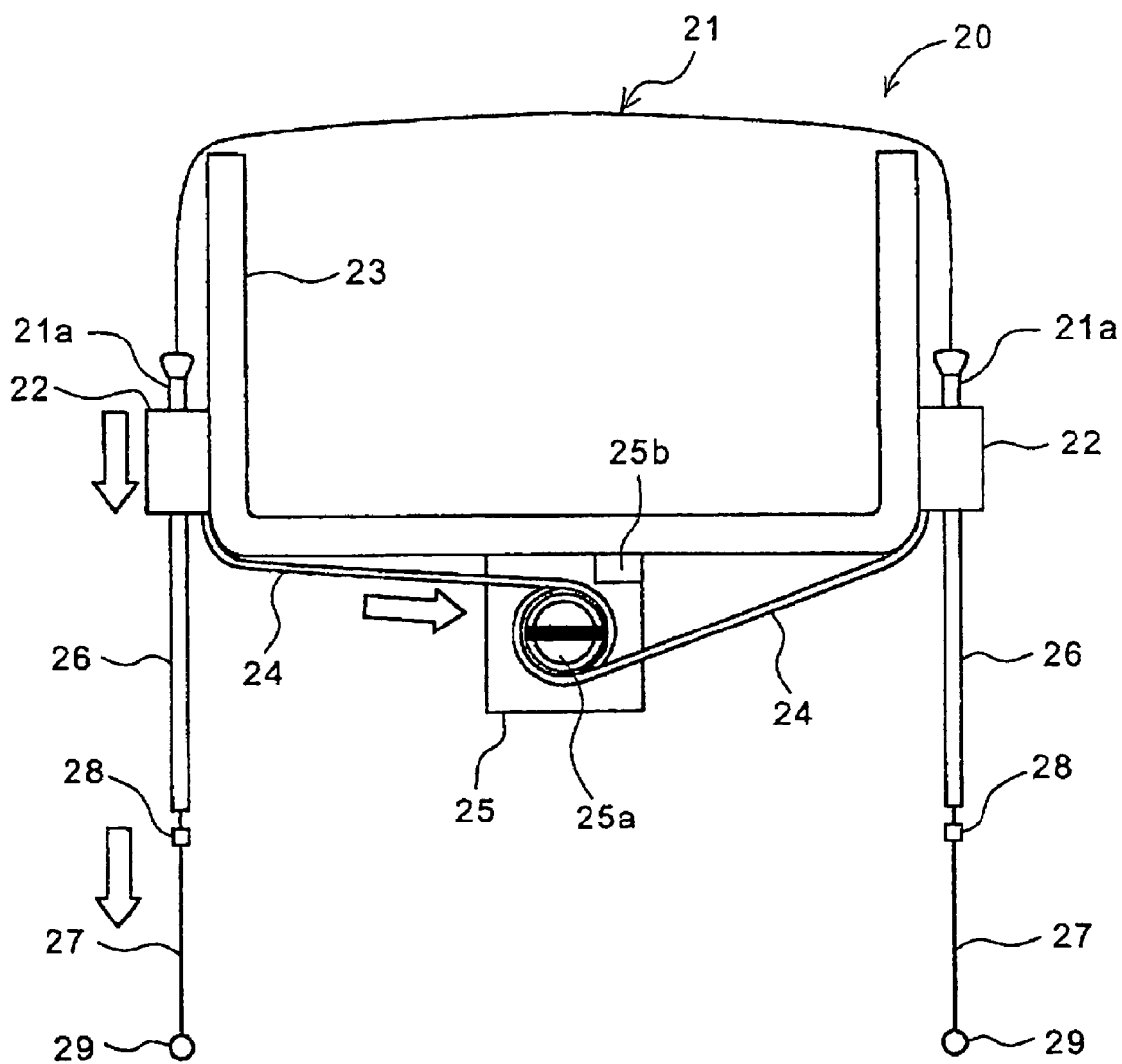
FIG. 9 is a view showing a state of the rider restraint apparatus according to the present invention when a winding belt is wound up.

FIG. 9 shows a state where the belt 21 is wound up by the retractor 25*a*. At collision of the two-wheeled vehicle 1, upon detection of the collision by means of the collision detection sensor, a small amount of explosive explodes in the inflator 25*b*. A rotor or a piston coupled to a rotation shaft of the retractor 25*a* is driven by pressure of gas generated by a chemical reaction of the explosion, and the winding belts 24 are instantly wound. In other words, the pretension function works. Thereafter, the retractor 25*a* locks the belt 21 and exerts a restraint force so that the rider cannot leave forward.

The retractor unit 25 includes a load limiter function to prevent the restraint force of the belt 21 from increasing beyond a predetermined value. The function is to gradually release the winding belts 24 to be loosened when the restraint force reaches a predetermined value and reduce impact subjected to the rider. After wound as shown in FIG. 9, the winding belts 24 are gradually loosened while absorbing the impact.

Figure 10:
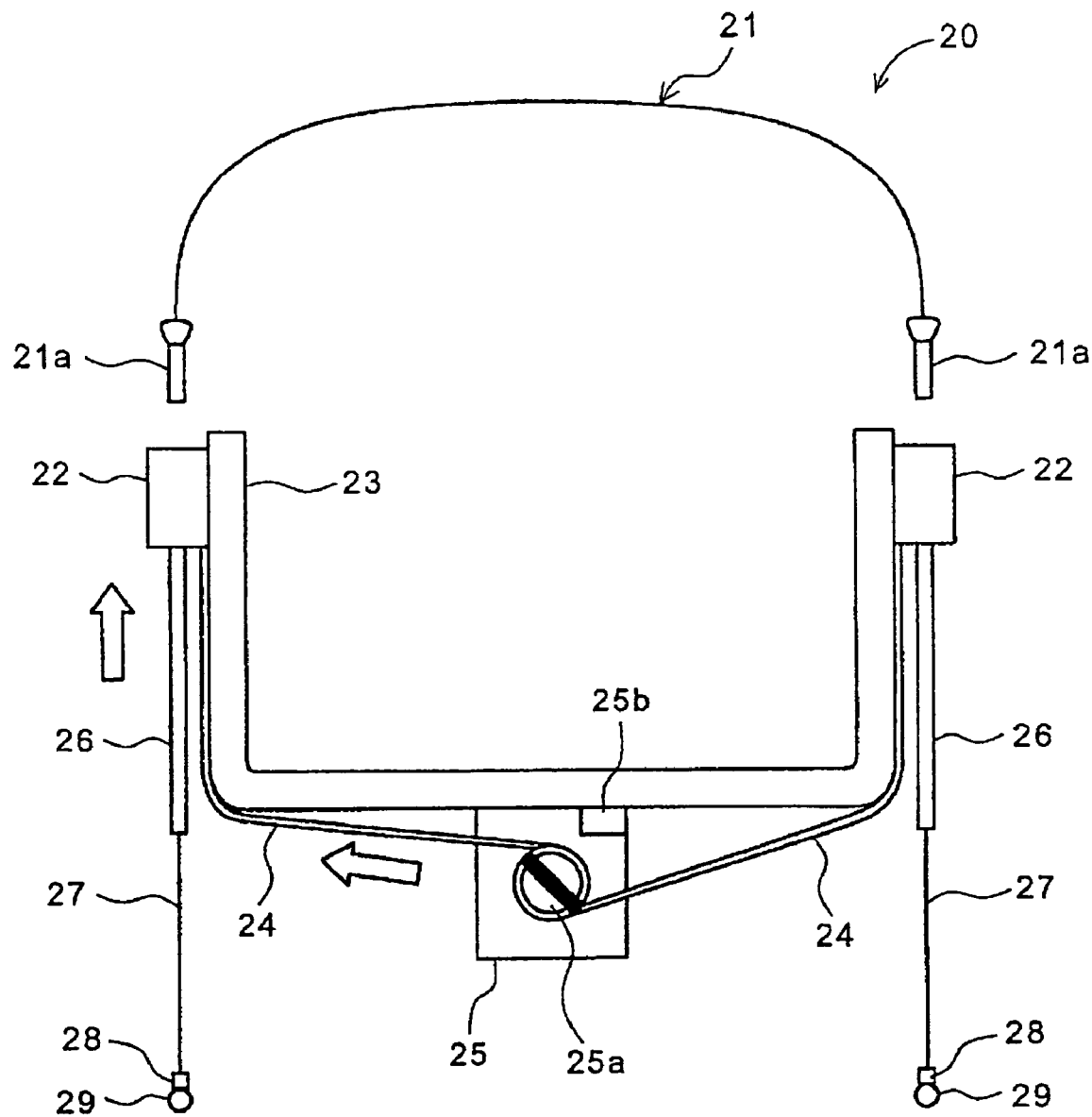
FIG. 10 is a view showing a state of the rider restraint apparatus according to the present invention when the winding belt is released.

FIG. 10 shows a state at a predetermined period of time after the belts 24 are wound up as shown in FIG. 9. When the wound winding belts 24 are loosened by means of the load limiter function and the buckles 22 accordingly slide on the guide rail 23 by a predetermined distance, the belt 21 are released from the buckles 22. In other words, the rider is released from the vehicle. In this case, it is preferable that the tongues 21*a* on the both ends of the belt 21 be released from the buckles 22 at substantially the same time. The restraint of the rider is released when a secondary motion after the collision occurs, and an influence of the secondary motion can be reduced.

The state of the released belt 21 shown in FIG. 10 is also achieved by the rider continuing to pull the belt 21 in the state shown in FIG. 8 where the vehicle is normally running or is stopped. Accordingly, also in the case of comparatively low speed where the secondary motion is less likely to occur and the rider wants to leave the vehicle quickly, the rider can leave the vehicle without a manual operation to release the restraint means.

The above description is given of the embodiment of the present invention, but the present invention is not limited to the aforementioned embodiment. It is possible to make various designs without departing from the present invention described in the claims. For example, it is easy to conceive of an application of the present invention to a three-point seat belt in a vehicle including a backrest in a seat or the like.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rider restraint apparatus for restraining movement of a rider, comprising:
   a seat belt-shaped rider restraint for restraining the rider;
   an engaging/disengaging device making said rider restraint releasable;
   a rail for making said engaging/disengaging device slidable;
   a control for controlling sliding of said engaging/disengaging device; and
   a coupling release device for releasing a coupling between said rider restraint and said engaging/disengaging device in conjunction with the sliding of said engaging/disengaging device,
   wherein said coupling release device releases the coupling between said restraint and said engaging/disengaging device when said engaging/disengaging device slides along said rail by a predetermined distance or more.

2. The rider restraint apparatus according to claim 1, wherein said rider restraint includes, at each of its ends, a coupling portion which is engaged with said engaging/disengaging device, and a device allowing said coupling portion to be released, and said coupling release device are provided for said rail in a pair.

3. The rider restraint apparatus according to claim 2, wherein said rail is formed into a substantially U-shape.

4. The rider restraint apparatus according to claim 3, wherein said coupling release device includes a wire attached to said engaging/disengaging device, a wire end formed at an end of the wire, and a wire stopper restricting motion of the wire end.

5. The rider restraint apparatus according to claim 4, wherein an end of an outer tube is attached to the said engaging/disengaging device, and the outer tube covers a part of said wire.

6. The rider restraint apparatus according to claim 2, wherein said coupling release device includes a wire attached to said engaging/disengaging device, a wire end formed at an end of the wire, and a wire stopper restricting motion of the wire end.

7. The rider restraint apparatus according to claim 6, wherein an end of an outer tube is attached to the said engaging/disengaging device, and the outer tube covers a part of said wire.

8. The rider restraint apparatus according to claim 1, wherein said rail is formed into a substantially U-shape.

9. The rider restraint apparatus according to claim 8, wherein said coupling release device includes a wire attached to said engaging/disengaging device, a wire end formed at an end of the wire, and a wire stopper restricting motion of the wire end.

10. The rider restraint apparatus according to claim 9, wherein an end of an outer tube is attached to the said engaging/disengaging device, and the outer tube covers a part of said wire.

11. The rider restraint apparatus according to claim 1, wherein said coupling release device includes a wire attached to said engaging/disengaging device, a wire end formed at an end of the wire, and a wire stopper restricting motion of the wire end.

12. The rider restraint apparatus according to claim 11, wherein an end of an outer tube is attached to the said engaging/disengaging device, and the outer tube covers a part of said wire.

13. The rider restraint apparatus according to claim 1, wherein said an engaging/disengaging device making said rider restraint detachable includes a buckle on each end of the rider restraint.

14. A rider restraint apparatus, comprising:
   a rider restraint belt;
   a rail;
   at least one buckle, said at least one buckle being slidable on said rail and said rider restraint belt being detachable from said rail by said at least one buckle;
   a retractor unit, the sliding of said at least one buckle on said rail being controlled by said retractor unit; and a coupling release device, said at least one buckle detaching said rider restraint belt when said at least one buckle slides along said rail by a predetermined distance or more.

15. The rider restraint apparatus according to claim 14, wherein said rider restraint belt includes a coupling portion at each of its ends, said coupling portions being respectively engaged with a pair of said at least one buckle.

16. The rider restraint apparatus according to claim 15, wherein there are a pair of said coupling release devices, said pair of coupling release devices being provided for said pair of buckles, respectively.

17. The rider restraint apparatus according to claim 14, wherein said rail is formed into a substantially U-shape.

18. The rider restraint apparatus according to claim 14, wherein said coupling release device includes a wire attached to said buckle, a wire end formed at an end of the wire, and a wire stopper restricting motion of the wire end.

19. The rider restraint apparatus according to claim 18, wherein an end of an outer tube is attached to the said buckle, and the outer tube covers a part of said wire.

20. A rider restraint apparatus, comprising:
a rider restraint belt;
a rail;
at least one buckle, said at least one buckle being slidable on said rail and said rider restraint belt being detachable from said rail by said at least one buckle;
a retractor unit mounted on a rear side of the rail, the sliding of said at least one buckle on said rail being controlled by said retractor unit; and
a coupling release device, said at least one buckle detaching said rider restraint belt when said at least one buckle slides along said rail by a predetermined distance or more.

* * * * *